E. H. BRADY.
ELECTRIC GENERATOR COUPLING FOR WINDMILLS.
APPLICATION FILED NOV. 7, 1917.
1,279,642.
Patented Sept. 24, 1918.
2 SHEETS—SHEET 1.
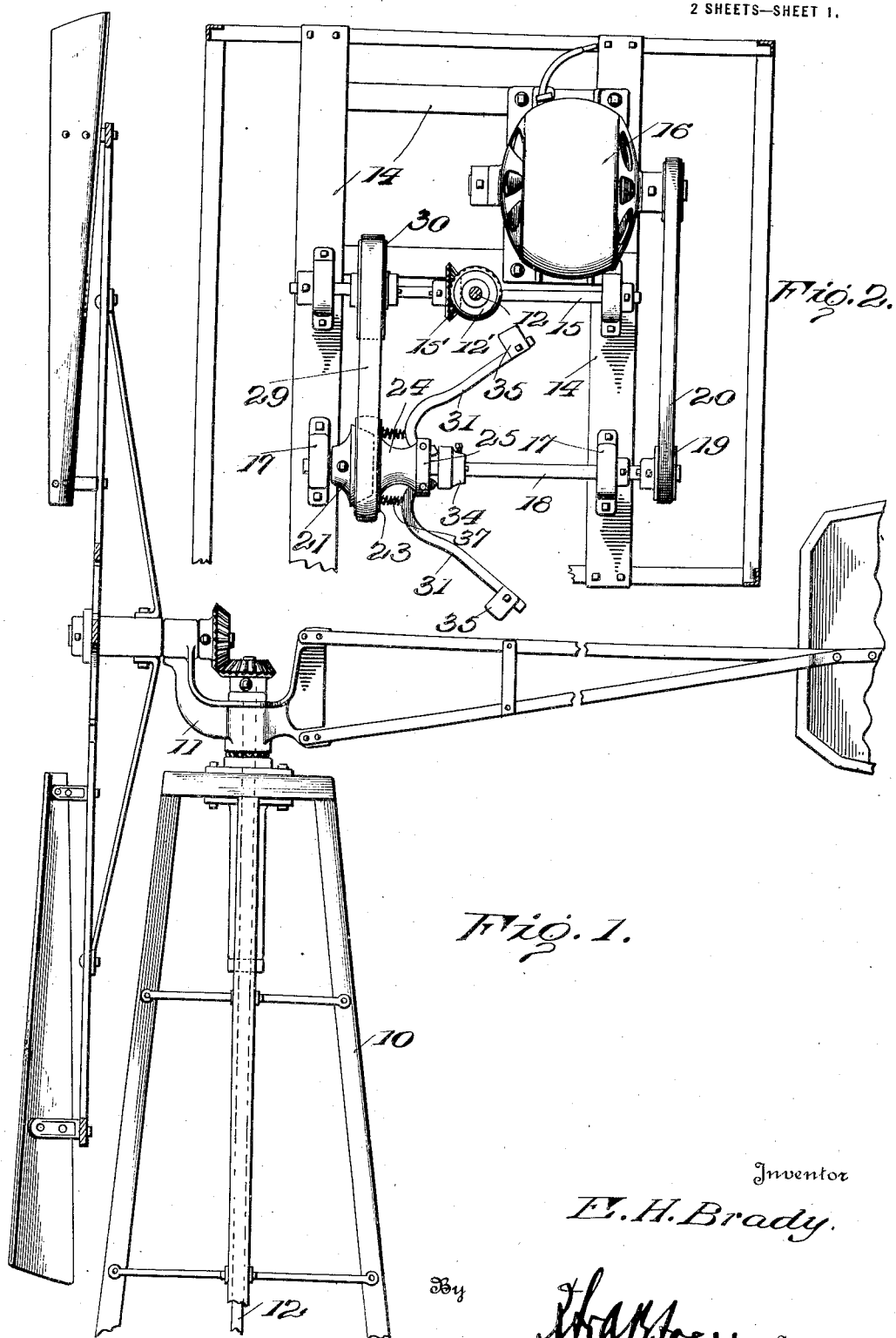

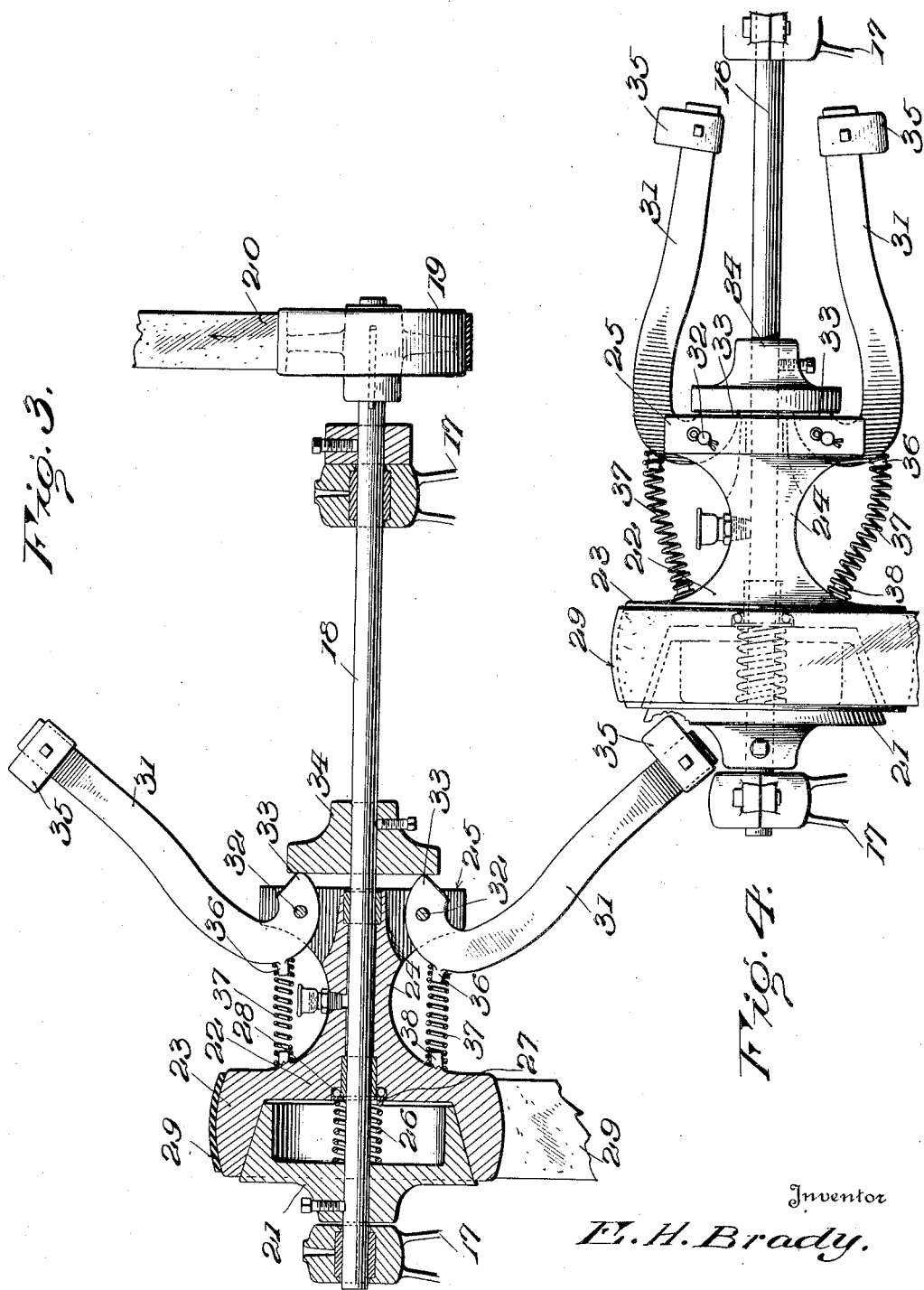

UNITED STATES PATENT OFFICE.

EUGENE H. BRADY, OF FLINT, MICHIGAN.

ELECTRIC-GENERATOR COUPLING FOR WINDMILLS.

1,279,642.  Specification of Letters Patent.  Patented Sept. 24, 1918.

Application filed November 7, 1917. Serial No. 200,799.

*To all whom it may concern:*

Be it known that I, EUGENE H. BRADY, a citizen of the United States, residing at Flint, in the county of Genesee and State of Michigan, have invented certain new and useful Improvements in Electric-Generator Couplings for Windmills, of which the following is a specification.

This invention relates to an improved electric generator coupling for windmills and has as its primary object to provide a construction wherein, when the windmill has obtained a certain fixed speed, an electric generator or dynamo will be automatically coupled with the windmill to be driven thereby.

The invention has as a further object to provide an arrangement wherein the generator will be coupled with the windmill only when the windmill is revolving at a speed sufficient to drive the dynamo for generating a current of a given voltage so that the dynamo will not be operated when the speed of the windmill will be insufficient to properly drive the dynamo.

And the invention has as a still further object to provide a device of the above described character which may be employed in connection with substantially any conventional type of windmill to thus produce an arrangement whereby electricity may be generated in rural districts for general farming purposes.

Other and incidental objects will appear as the description proceeds and in the drawings wherein I have illustrated the preferred embodiment of the invention and wherein similar reference characters designate corresponding parts throughout the several views:

Figure 1 is a fragmentary side elevation showing a conventional type of windmill equipped with a drive shaft for my improved coupling, Fig. 2 is a sectional view taken through the windmill tower and showing the platform upon the tower for supporting the coupling, Fig. 3 is a longitudinal sectional view showing the device detached and illustrating the clutch employed for coupling the generator with the windmill, this view illustrating the governor arms controlling the clutch as arranged to close the clutch, and Fig. 4 is a fragmentary side elevation showing the governor arms for the clutch arranged in normal position with the clutch open.

In order that the construction, mounting and operation of my improved device may be accurately understood, I have, in the drawings, shown the device in connection with a conventional type of windmill having a tower 10 upon the upper end of which is rotatably mounted a suitable carriage 11. Rotatably fitted through this carriage is a vertical drive shaft 12 upon the upper end of which is arranged a suitable pinion coacting with a similar pinion upon the shaft of the wind wheel. Keyed or otherwise secured upon the lower end of the shaft 12 is a pinion 12'. Mounted in any approved manner upon the windmill tower at a suitable elevation is a platform 14. The structural details of this platform may be such as will be found most expedient.

In carrying out the invention, I employ a horizontal counter-shaft 15 which is journaled upon the platform 14 and is equipped with a pinion 15' meshing with the pinion 12' of the shaft 12. Arranged upon the platform at one side of the shaft 15 is a generator or dynamo as conventionally shown at 16. Upstanding from the platform at the opposite side of the shaft 15 are bearing brackets 17 upon which is journaled a horizontal drive shaft 18. Mounted upon the outer extremity of this shaft is a pulley 19 over which is trained a belt 20 to the drive pulley of the generator 16.

Fixed upon the inner extremity of the shaft 18 is a clutch element or cone 21 and slidably mounted upon the shaft to coöperate with this clutch cone is a clutch body 22. The clutch body 22 is formed at one end with an annular head 23 from which extends a reduced shank 24 provided at its outer end with an annular shoulder or base 25. The head 23 of the clutch body is hollowed out to receive the cone 21 and interposed between the said head and the cone is a helical spring 26 surrounding the shaft 18 and engaging at its inner end with a washer 27 supported by a plurality of anti-friction devices 28 arranged within a suitable ball race at the inner end of the head. The clutch body 22 may thus turn freely with respect to the spring with the spring normally acting to urge the clutch body away from the cone 21 to hold the clutch open. The annular head 23 of the clutch body provides a belt pulley around which is trained a belt 29 engaged with a suitable pulley 30 upon the adjacent extremity of the counter-shaft 15. Consequently, as will be well understood, rotation of the wind wheel of the mill will normally turn the clutch body 22.

At opposite sides thereof, the base 25 of the clutch body 22 is formed with radial slots and mounted to swing within these slots are governor arms 31 secured by suitable pivot pins 32. As particularly shown in Fig. 3 of the drawings, the inner extremities of the arms 31 are formed with inwardly curved terminals 33 projecting beyond the pivot pins 32 and adapted to fulcrum upon a collar 34 adjustably fixed upon the shaft 18. Slidably mounted upon the outer extremities of the governor arms are suitable weights 35 adjustable longitudinally upon the said arms. At the inner extremities of the arms 31, the curved portions thereof are provided upon their outer edges with upstanding centering lugs 36 over which are fitted suitable springs 37, the inner terminals of which are received by similar centering lugs 38 upon the lower side of the head 22 of the clutch body. The springs 37 will, as shown in Fig. 4 of the drawings, therefore normally hold the free extremities of the governor arms 31 inwardly adjacent the drive shaft 18.

As will now be clear, rotation of the clutch body 22 from the wind wheel of the windmill will also rotate the governor arms 31. Consequently, when the wind wheel has obtained a sufficient velocity, the governor arms 31 will, by centrifugal action, be swung outwardly upon the clutch body to engage the inner terminals 33 of the said arms with the collar 34 for shifting the clutch body upon the drive shaft 18 against the tension of the spring 26 to engage the clutch cone 21. The drive shaft 18 will thus be automatically coupled with the drive shaft of the windmill for operating the generator 16. In this connection, it will, of course, be clear that the velocity of the wind wheel at which the drive shaft 18 will be coupled with the drive shaft 12 of the windmill may be regulated by adjusting the weights 35 longitudinally upon the governor arms 31. A further adjustment in this regard may be had by removing the springs 37 and substituting other springs of different tension since these springs are arranged to resist the outward movement of the governor arms. Furthermore, a still further adjustment may be had by removing the spring 26 and substituting another spring of a different tension therefor since this spring 26 is arranged to resist the movement of the clutch body to engage the clutch cone. The velocity of the wind wheel at which the generator will be coupled with the drive shaft of the said wind wheel may thus be easily varied and it is the intention of the present invention that the generator shall be so coupled with the wind wheel of the windmill only when the said wheel has obtained a speed sufficient to drive the generator or dynamo for generating a current of a relatively constant voltage sufficient for lighting purposes, for driving farm machinery, or other general farming purposes. Consequently, at such times as the wind wheel is not rotating at sufficient speed to turn the dynamo for generating a current which could be used, the dynamo will remain idle.

It will therefore be seen that I provide a particularly desirable arrangement for the purpose set forth and a construction especially adapted for use in rural districts for generating electricity for general farming purposes and without the incurrence of any operating cost. Preferably suitable storage batteries will be employed in connection with the dynamo for storing up the current as it is generated, and since such storage batteries may be of any approved design, they have not been illustrated.

Having thus described the invention, what is claimed as new is:

1. A generator coupling for windmills including a drive shaft, a clutch element fixed thereon, a clutch body slidable upon the shaft and enlarged at one extremity to form a pulley adapted to receive a belt operatively connected with a windmill for rotating the clutch body therefrom, and means between the clutch body and the shaft for automatically shifting the said body to engage the clutch element at a predetermined rotary speed of the clutch body.

2. A generator coupling for windmills including a drive shaft, a clutch element fixed thereon, a clutch body slidable upon the shaft, means for rotating the clutch body with respect to the shaft, governor arms swingingly mounted upon the clutch body, yieldable means bearing between the clutch body and the said governor arms and resisting the outward swinging movement of the said arms, and means fixed upon the shaft for engagement by the governor arms to shift the clutch body into engagement with the said element at a predetermined rotary speed of the clutch body.

3. A generator coupling for windmills including a drive shaft, a clutch element fixed thereon, a clutch body slidable upon the shaft and enlarged at one extremity to provide a pulley adapted to receive a belt operatively connected with a windmill for rotating the clutch body therefrom, governor arms swingingly mounted upon the clutch body, springs bearing between the inner side of said pulley and the governor arms and resisting the outward swinging movement of the said arms, and means fixed upon the shaft for engagement by the governor arms to shift the clutch body into engagement with the said element at a predetermined rotary speed of the clutch body.

4. In a device of the character described, the combination with a driven shaft having a pulley thereon, and a belt trained over said pulley, of a generator coupling including a drive shaft, a clutch member fixed thereon, a clutch body slidable upon the said drive shaft, means between the clutch body and the drive shaft for automatically shifting the body to engage the clutch member at a predetermined speed of the clutch body, and a belt pulley carried by the clutch body and receiving said belt for rotating the clutch body from the driven shaft.

In testimony whereof I affix my signature.

EUGENE H. BRADY. [L. S.]